Oct. 27, 1942.   O. C. MUSSELMAN   2,300,164
REMOTE CONTROL MECHANISM FOR SULKY RAKES
Filed March 8, 1941   2 Sheets-Sheet 1
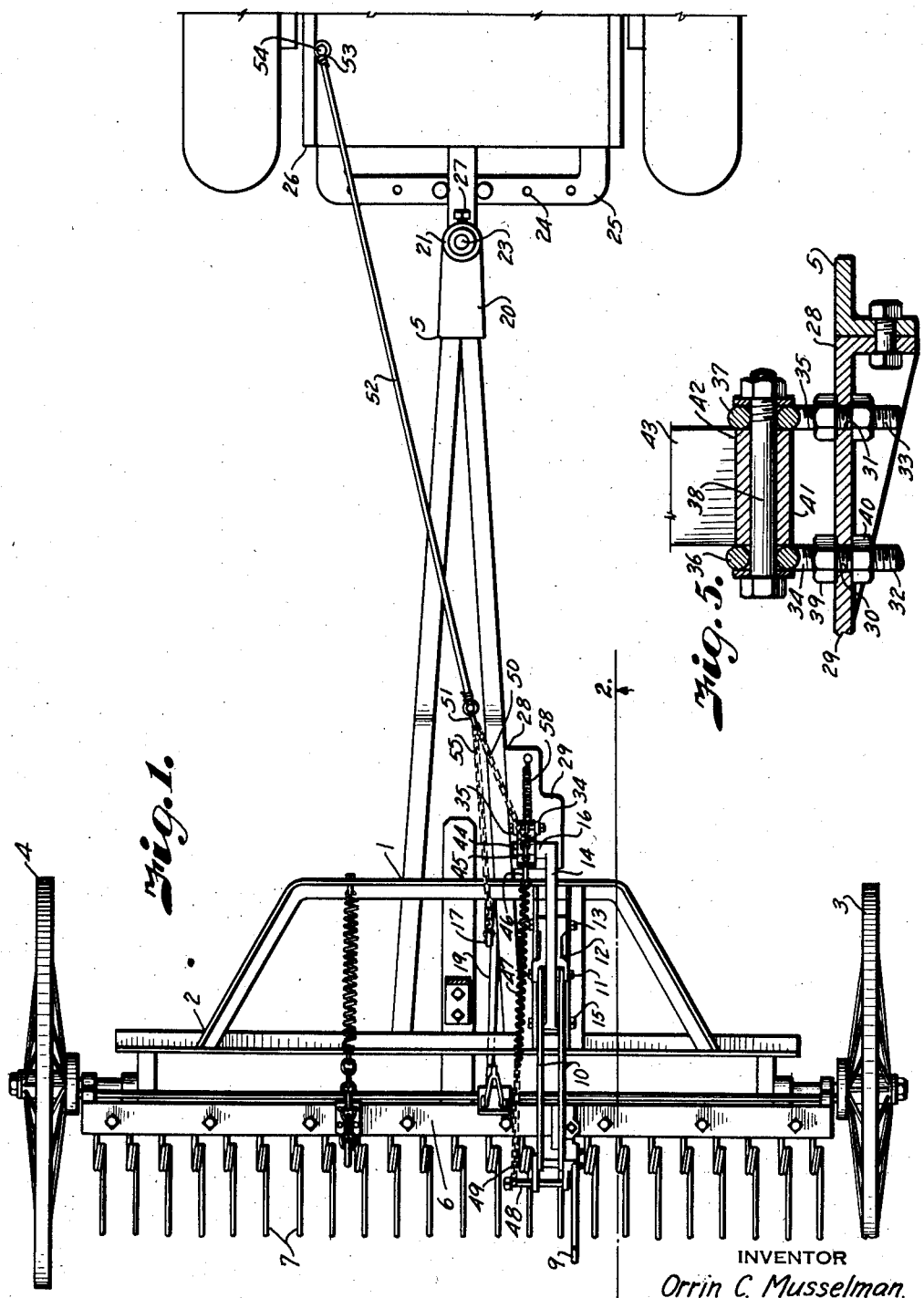
INVENTOR
Orrin C. Musselman.
BY Arthur E. Brown
ATTORNEY Oct. 27, 1942.    O. C. MUSSELMAN    2,300,164
REMOTE CONTROL MECHANISM FOR SULKY RAKES
Filed March 8, 1941    2 Sheets-Sheet 2
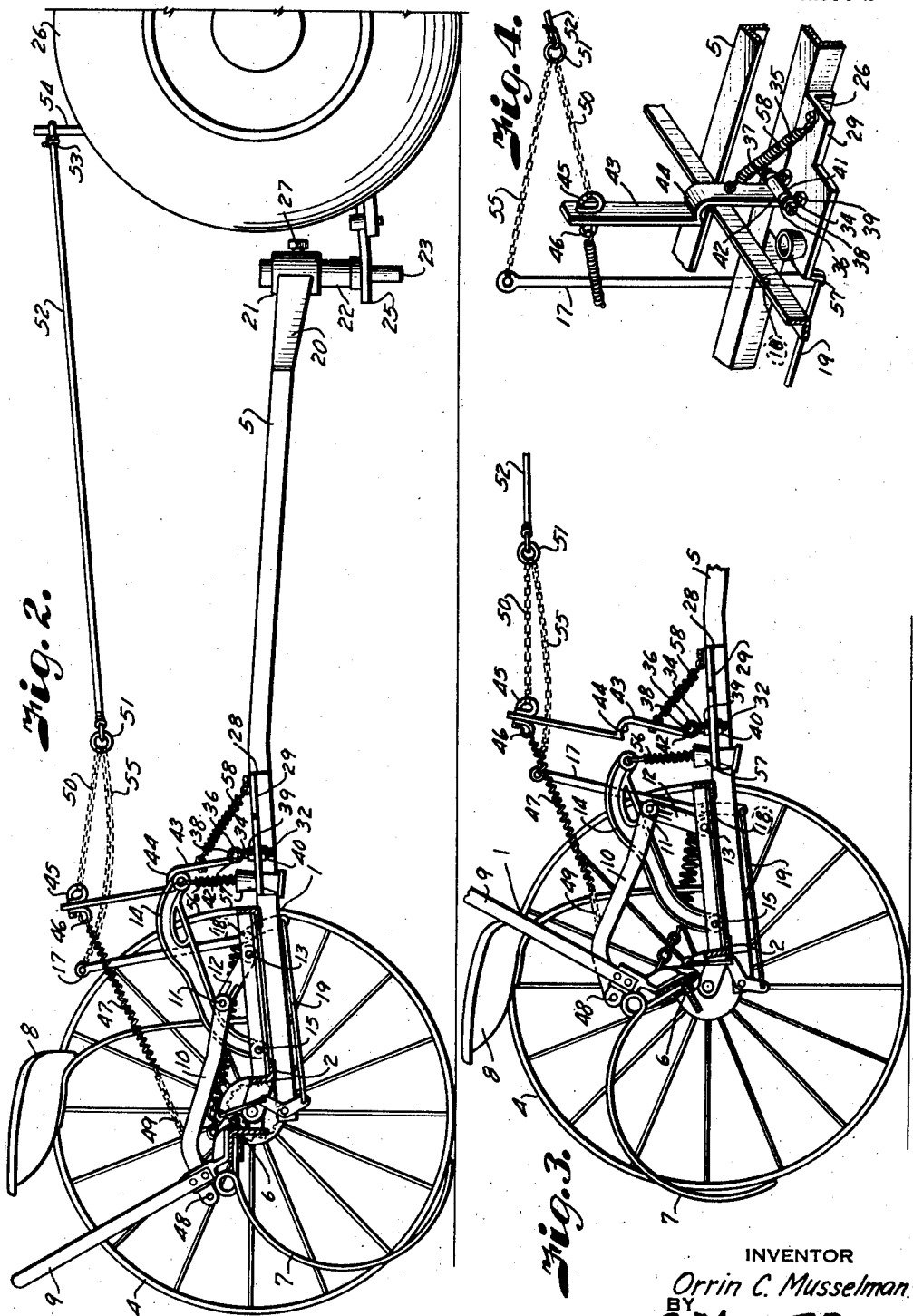
INVENTOR
*Orrin C. Musselman*
BY
*Arthur L. Brown*
ATTORNEY Patented Oct. 27, 1942

2,300,164

UNITED STATES PATENT OFFICE 2,300,164

REMOTE CONTROL MECHANISM FOR SULKY RAKES

Orrin C. Musselman, Kaw, Okla.

Application March 8, 1941, Serial No. 382,410

9 Claims. (Cl. 56—27)

This invention relates to sulky rakes, particularly of the type equipped with a foot lever for holding the teeth in raking position and a trip lever for releasing the ratchet mechanism which effects automatic raising of the teeth for dumping. These levers are mounted upon the frame of the rake within convenient reach of the operator's seat. In manipulating the levers, an operator mounts the seat and holds one foot against the rake tooth hold-down lever until the teeth have loaded with material being raked, whereupon the hold-down lever is released and the trip lever actuated to effect automatic dump of the material in forming windrows. Such a rake is designed to be manipulated by the driver when the rake is horse-drawn, but when a rake of this character is drawn by a tractor vehicle two operators are required, one to manipulate the tractor and the other the hold-down and trip levers on the rake.

Therefore, the principal object of the invention is to provide the rake with means whereby the trip and hold-down levers may be remotely actuated by the driver of the tractor, thereby releasing the second man for other duties.

In accomplishing this and other objects of the invention, as hereinafter pointed out, I have provided improved details of structure, the preferred form of which is illustrated in the accompanying drawings, wherein:

Fig. 1 is a plan view of a sulky rake drawn by a tractor and equipped with a remote control mechanism embodying the features of the present invention.

Fig. 2 is a sectional view through the sulky rake on the line 2—2 of Fig. 1, the control mechanism being shown in position to engage the hold-down lever and retain the teeth in raking position.

Fig. 3 is a similar section through the rake showing the lever control mechanism in tripped position to release the hold-down lever and effect actuation of the trip lever for effecting automatic dump of the rake teeth.

Fig. 4 is a detail perspective view of the lever control mechanism.

Fig. 5 is a detail section through the hold-down latch supporting bracket.

Referring more in detail to the drawings:

1 designates a sulky rake including a frame 2 carried by wheels 3 and 4 in the manner of a sulky and provided with a tongue 5. Pivotally connected with the frame and positioned between the wheels is a bar 6 carrying the rake teeth 7. Fixed to the frame 2, at approximately the center thereof, is an operator's seat 8 wherefrom the operator may control dumping of the rake teeth and drive a team hitched to the tongue 5.

The teeth carrying bar 6 is provided with a hand-lever 9 located adjacent the seat so that the operator may grasp a lever to dump the rake manually independently of an automatic dumping mechanism. Also connected with the bar 6, and extending forwardly relatively to the hand-lever 9, are links 10 pivotally connected at their forward ends, as at 11, with a toggle lever 12 having its opposite end pivotally connected with the frame 2, as at 13.

The teeth 7 are retained in raking position by means of a foot lever 14 pivoted at one end to the frame 2, as at 15, so that the opposite end extends forwardly over the toggle lever pivot 11 to bear thereagainst and retain the toggle lever in depressed position and the teeth in raking position as shown in Fig. 2, when the operator's foot is placed on a foot pedal 16 extending laterally from the forward end of the lever.

The rake is further equipped with an automatic dumping mechanism operable by traction of the wheels and released by means of a lever 17 also mounted adjacent the driver's seat and pivoted, as at 18, to the frame 2, the lever 17 being connected by a suitable linkage 19 with the ratchet mechanism connecting the tooth supporting bar 6 with the wheels 3 and 4.

In manipulating the rake, the operator places his foot upon the pedal 16 to depress the toggle lever 12 and retain the teeth 7 in raking position, as shown in Fig. 2. When it is desired to dump the rake, the operator releases pressure on the pedal 16 and pushes the trip lever 17 in a forward direction to effect actuation of the automatic dump, whereby the teeth 7 are raised under traction power of the wheels and automatically released to return to raking position. During this movement the toggle lever will swing upwardly with raising of the teeth, as shown in Fig. 3, and then downwardly to the position shown in Fig. 2. The operator will then replace his foot on the hold-down pedal 16 until another windrow is to be formed, whereupon the operations will be repeated to dump the rake material.

The structure thus far described is conventional of a standard make sulky rake, and specifically forms no part of the present invention, the present invention being to provide the rake with a remote control mechanism whereby the hold-down and trip levers may be manipulated by the driver of a tractor when the rake is hitched thereto in place of draft animals.

In carrying out the invention, the tongue 5 extends forwardly and carries a bracket 20 on its formost end having a collar 21 arranged with the axis thereof in perpendicular position to receive a coupling pin 22, the lower end of which has a reduced pintle 23 engaging in one of the openings 24 of the draw-bar 25 of a tractor 26. The collar 21 is adjustable vertically on the pin 22 to support the tongue of the rake at the desired elevation, after which it is retained by a set-screw 27 threaded through the collar and having its shank engaging the end of the pin 22. The pintle portion 23 of the pin swivels in the opening of the draw-bar so that the rake will trail the tractor.

Mounted on the side of the tongue, at a point below the foot pedal 16, is an angle-shaped bracket 28 having a laterally extending arm 29. Extending through suitably spaced openings 30 and 31 in the arm of the bracket are the shanks 32 and 33 of eye-bolts 34 and 35, the eyes 36 and 37 of which are arranged coaxially to pass a pivot pin or bolt 38. The shanks 32 and 33 of the eye-bolts are provided with nuts 39 and 40 arranged to engage the respective upper and lower faces of the arm 29 to adjust elevational position of the pin 38 relatively to the foot pedal 16. Pivoted on the pin 38, intermediate the eyes 36 and 37, is a sleeve-like hub 41 of a latch lever 42.

The latch lever includes an upwardly extending arm 43, having a hook-shaped offset portion 44 adapted to engage over the foot pedal 16 and retain it in hold-down position, as shown in Fig. 2. From the offset, the lever extends upwardly and carries hooks 45 and 46 on the front and rear sides thereof. Connected with the hook 46 is one end of a spring 47, having its opposite end secured to a fixed part carried upon the bar 6, for example a pin 48 on the lower end of the lever 9, the connection between the pin and spring being by a flexible chain or the like 49. When the rake teeth are down the spring 47 is tensioned to retain the hook portion of the latch lever yieldingly in engagement with the foot pedal. Connected with the hook 45 is a flexible member, such as a chain 50, carrying a ring 51 to which a cable 52 is connected, as indicated at 53. The opposite end of the cable extends forwardly of the tongue and is attached to a fixed support 54 on the tractor.

It is thus obvious that when the operator of the tractor pulls on the cable 52, the latch lever is moved forwardly, Fig. 2, to release the foot pedal 16 so that the teeth of the rake may be operated to effect dumping of the raked material. In order to release the trip lever 17, the upper end thereof is also coupled with the ring 51 by a flexible connection, such as a chain 55, having slack therein so that the latch lever 42 is disengaged from the pedal prior to actuation of the trip lever.

In order to assist in returning of the foot lever 14 to latched position after dumping of the rake, the end thereof is connected by a spring 56, having its opposite end anchored in a guard 57 carried by the bracket arm 29, the guard being to prevent kinking of the spring.

58 designates a spring having one end fixed to the latch lever and its opposite end fixed to the arm 29 of the lever supporting bracket 28 for holding the latch lever forwardly until the foot lever falls back to latching position.

Assuming that the rake is in operation and being drawn over a field by the tractor, in this position the latch lever 42 is engaged with the pedal 16 of the hold-down lever and the toggle is depressed to retain the teeth in raking position. When the teeth are down, the spring 47 is tensioned to retain the latch lever yieldingly in latching position. In this position the chain 49 is taut but there is sufficient slack in the chain 55 to avoid pull on the trip lever 17. When the operator desires to dump the rake, he will pull the cable 52 in a forward direction, causing the latch lever 42 to disengage the foot pedal 16 against action of the spring 47. Continued forward movement removes slack from the chain 55 and effects actuation of the trip lever 17 so that the automatic dump is effective in raising the teeth 7. Upon raising of the teeth 7, the bar 6 swings in a forward direction, releasing tension on the latch lever by the spring 47, however, the spring 58 is in play to hold the latch lever in retractive position until the hold-down lever 14 returns to normal position upon dropping of the rake teeth. As the teeth move to raking position, the bar 6 swings rearwardly to retension the spring 47, drawing the latch lever into engagement with the foot pedal to retain the hold-down lever in position until such a time it is again necessary to dump the rake, whereupon the operations are repeated as above described.

From the foregoing it is obvious that I have provided a simple mechanism for effecting remote control of the hold-down and trip release levers of a sulky rake whereby the operator of a tractor vehicle drawing the rake may actuate the controls and eliminate the necessity of an operator riding upon the seat of the rake. The control mechanism described, with slight modification, may be adapted to any make of sulky rake as all sulky rakes are equipped with the hold-down and control levers similar to the rake illustrated and described.

What I claim and desire to secure by Letters Patent is:

1. In a rake having a frame and a tooth carrier pivoted relative to the frame, means for raising and lowering the tooth carrier, a hold-down lever on the frame for engaging the raising and lowering means to hold the tooth carrier in raking position, a latch lever having pivotal connection with the frame and provided with a hook portion engageable with the hold-down lever, an arm projecting from said hook portion, a yieldable connection between said arm and the tooth carrier to hold the hook portion of said lever in engagement with the hold-down lever and to return said lever responsive to lowering movement of the tooth carrier, and means connected with said arm for remotely releasing said latch lever from said hold-down lever.

2. In a rake having a frame, a tooth carrier, means for raising and lowering the tooth carrier relative to the frame, and a hold-down lever for engaging the raising and lowering means to hold the tooth carrier in raking position, remote control means for said hold-down lever including a latch lever having a hook portion engageable with the hold-down lever, a pivot pin supporting the latch lever, a yieldable connection between the latch lever and the tooth carrier to return the latch lever into latching engagement with the hold-down lever upon lowering of the tooth carrier, means adjustably mounting said pin on the frame to adjust the hook portion of said latch lever relatively to said hold-down lever, and a cable connected with the latch lever to effect disengagement of the latch by the operator of a tractor pulling said rake.

3. In a rake having a tooth carrier, automatic means for manually raising and lowering the tooth carrier, a hold-down lever for engaging the raising and lowering means to hold the tooth carrier in raking position, a trip lever for said automatic means, a latch for retaining the hold-down lever in hold-down position, a cable connected with said latch and trip lever for remotely releasing the hold-down lever and actuating the trip lever, and a yieldable connection between the tooth carrier and the latch for returning the latch into engagement with the hold-down lever responsive to lowering of the tooth carrier.

4. In a rake having a tooth carrier, automatic means for manually raising and lowering the tooth carrier, a hold-down lever for engaging the raising and lowering means to hold the tooth carrier in raking position, a trip lever for said automatic means, a latch for retaining the hold-down lever in hold-down position, a cable connecting said latch and trip lever for remotely releasing the hold-down lever and actuating the trip lever, a yieldable connection between the latch and said tooth carrier for returning the latch into latching engagement with the tooth carrier responsive to lowering of the tooth carrier and for yieldingly retaining the latch in engagement with the hold-down lever, and a spring for holding the latch out of engagement with the hold-down lever during raising of the tooth carrier.

5. In a rake, a frame, a tooth carrier pivotally supported on the frame, a tongue connecting the rake with the draw-bar of a tractor, means for manually raising and lowering the tooth carrier, a hold-down lever for engaging the raising and lowering means to hold the tooth carrier in raking position, automatic means for raising the tooth carrier, a trip lever for said automatic means, a bracket for attachment to the tongue adjacent the hold-down lever, a latch pivoted on said bracket for retaining the hold-down lever in hold-down position, a cable connecting said latch and trip lever for remotely releasing the hold-down lever and actuating the trip lever, and a yieldable connection between the latch and said tooth carrier for returning the latch into engagement with the hold-down lever responsive to lowering of the tooth carrier and for yieldingly retaining the latch in engagement with the hold-down lever.

6. A remote control attachment for a rake having hold-down and trip levers, and a tongue for connecting said rake with a tractor, including a bracket adapted for attachment to said tongue, a latch pivoted on said bracket for retaining the hold-down lever in hold-down position, flexible connections secured to the latch and trip lever respectively, and a cable connected with said flexible connections for remotely releasing the hold-down lever and actuating the trip lever, said flexible connection for the trip lever having sufficient slack to delay action of the trip lever responsive to pull on the cable.

7. In a rake having a tooth carrier, means for manually raising and lowering the tooth carrier, a hold-down lever for engaging the raising and lowering means to hold the tooth carrier in raking position, automatic means for raising the tooth carrier, a trip lever for said automatic means, a latch for retaining the hold-down lever in hold-down position, an operating cable, and flexible members connecting said latch and trip lever with said cable, the flexible member connected with the trip lever having slack therein whereby pull on said cable actuates the latch before the trip lever is actuated.

8. In a rake including a wheel frame, a tooth carrier pivotally supported on the wheel frame, means for raising and lowering the tooth carrier, a hold-down lever for holding the tooth carrier in raking position, a trip for effecting actuation of the raising and lowering means, a latch for retaining the hold-down lever in hold-down position, a flexible connection secured to the latch and trip respectively, a cable connected with the flexible connections for remotely releasing the hold-down lever and actuating the trip, said flexible connection for the trip having sufficient slack to delay action of the trip responsive to pull on the cable, and a yielding connection between the latch and the tooth carrier for returning the latch into latching engagement responsive to lowering movement of the tooth carrier.

9. In a rake including a wheel frame, a tooth carrier pivotally supported on the wheel frame, means for raising and lowering the tooth carrier, a hold-down lever for holding the tooth carrier in raking position, a trip for effecting actuation of the raising and lowering means, a latch for retaining the hold-down lever in hold-down position, a flexible connection secured to the latch and trip respectively, a cable connected with the flexible connections for remotely releasing the hold-down lever and actuating the trip, said flexible connection for the trip having sufficient slack to delay action of the trip responsive to pull on the cable, a yielding connection between the latch and the tooth carrier for returning the latch into latching engagement responsive to lowering movement of the tooth carrier, and a spring connected with the latch and acting reversely to said yieldable connection to retain the latch out of engagement during raising of the tooth carrier.

ORRIN C. MUSSELMAN.